United States Patent
Lee et al.

(10) Patent No.: US 7,253,409 B2
(45) Date of Patent: Aug. 7, 2007

(54) ELECTROCHEMICAL NANO-PATTERNING USING IONIC CONDUCTORS

(75) Inventors: Minhwan Lee, Stanford, CA (US); Ryan O'Hayre, Castle Rock, CO (US); Turgut M. Gur, Palo Alto, CA (US); Friedrich B. Prinz, Woodside, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 155 days.

(21) Appl. No.: 11/185,914

(22) Filed: Jul. 20, 2005

(65) Prior Publication Data

US 2006/0284085 A1      Dec. 21, 2006

Related U.S. Application Data

(60) Provisional application No. 60/589,673, filed on Jul. 20, 2004.

(51) Int. Cl.
*G21K 7/00* (2006.01)
*G01N 23/00* (2006.01)
*H01L 21/44* (2006.01)
*B05D 5/00* (2006.01)

(52) U.S. Cl. ............ 250/309; 438/646; 438/674; 427/256; 427/287

(58) Field of Classification Search ........... 250/309, 250/306; 427/256, 287, 258; 438/647, 646, 438/626
See application file for complete search history.

(56) References Cited

U.S. PATENT DOCUMENTS

| | | | |
|---|---|---|---|
| 5,434,842 A | 7/1995 | Weiss et al. | 369/126 |
| 5,871,672 A * | 2/1999 | Murphy et al. | 252/514 |
| 6,440,662 B1 * | 8/2002 | Gerwen et al. | 435/6 |
| 6,635,311 B1 | 10/2003 | Mirkin et al. | 427/256 |
| 6,737,646 B2 | 5/2004 | Schwartz | 250/306 |
| 6,825,489 B2 | 11/2004 | Kozicki | 257/42 |
| 6,864,500 B2 | 3/2005 | Gilton | 257/2 |
| 6,867,443 B2 | 3/2005 | Liu et al. | 257/226 |
| 7,056,455 B2 * | 6/2006 | Matyjaszewski et al. | 264/29.2 |
| 2004/0008330 A1 | 1/2004 | Mirkin et al. | 355/53 |
| 2004/0079195 A1 * | 4/2004 | Perry et al. | 75/345 |
| 2004/0127025 A1 | 7/2004 | Crocker, Jr. et al. | 438/677 |

(Continued)

OTHER PUBLICATIONS

Utsugi, "Nanometre-scale chemical modification using a scanning tunneling microscope," Nature, vol. 347, Oct. 25, 1990, pp. 747-749.

*Primary Examiner*—Nikita Wells
*Assistant Examiner*—Johnnie L Smith, II
(74) *Attorney, Agent, or Firm*—Lumen Intellectual Property Services, Inc.

(57) ABSTRACT

The present invention provides nano-patterning based on flow of an ion current within an ionic conductor to bring ions in proximity to a microscope probe tip touching a surface of the conductor. These ions are then electrochemically reduced to form one or more features on the surface. Ion current flow and the electrochemical reaction are driven by an electrical potential difference between the tip and the ionic conductor. Such features can be erased by reversing the polarity of the potential difference. Indentations can be formed by mechanically removing features formed as described above. The ions in the ion current can be provided by the ionic conductor and/or by oxidation at a counter electrode.

15 Claims, 4 Drawing Sheets

U.S. PATENT DOCUMENTS

2004/0131843 A1  7/2004  Mirkin et al. ............... 428/327
2006/0062921 A1* 3/2006  Gorman et al. ............. 427/258
2006/0189142 A1* 8/2006  Saito et al. ................. 438/694
2006/0246467 A1* 11/2006 Wade et al. .................. 435/6

* cited by examiner

ELECTROCHEMICAL NANO-PATTERNING USING IONIC CONDUCTORS

CROSS REFERENCE TO RELATED APPLICATIONS

This application claims the benefit of U.S. provisional application 60/589,673, entitled "Electrochemical Metal Nano-patterning for Eraseable Memory Storage Using Ionic Conductors", filed on Jul. 20, 2004, and incorporated by reference herein.

GOVERNMENT SPONSORSHIP

This invention was made with support from the Office of Naval Research under award number N00014-02-1-0220. The government has certain rights in this invention.

FIELD OF THE INVENTION

This invention relates to micro-patterning or nano-patterning of a surface.

BACKGROUND

Micro-patterning of surfaces has been exploited for some time in various applications, such as lithography for semiconductor device fabrication. More recently, various nano-patterning techniques have been developed in order to controllably pattern a surface at smaller length scales than provided by conventional micro-patterning techniques. Some known nano-patterning approaches are based on scanning probe microscopy.

For example, U.S. Pat. No. 6,635,311 and U.S. 2004/0008330 relate to a nanolithography process where a probe tip is connected to a surface to be patterned by a water meniscus which can naturally form between the tip and surface. Material transport from the probe to the surface through the water meniscus provides nano-scale patterning. This approach often requires significant environmental control (e.g., temperature, humidity and gas composition control as considered in U.S. Pat. No. 6,737,646) in order to ensure operation as desired. This approach can be regarded as a direct nano-patterning method, since the surface being patterned is modified directly by the tip.

Alternatively, indirect nano-patterning via scanning microscopy entails use of a scanning microscope to pattern a resist, which is then further processed to pattern an underlying surface. Examples of indirect patterning are considered in U.S. 2004/0131843 and U.S. 2004/0127025. Direct nano-patterning methods are often preferable to indirect methods, since significant difficulties in transferring a nano-scale pattern from a resist to the underlying surface can arise.

Another example of direct nano-patterning is considered in an article by Utsugi (Nature, v347, pp 747–749, October 1990). In this work, a surface of a sample of $Ag_xSe$ is directly patterned by a scanning tunneling microscope (STM) probe tip. The probe tip in this work does not make physical contact with the surface. A tunneling current of electrons flows between the tip and the sample, on the order of 0.1 nA. The features formed in this work are permanent trenches. The mechanism for feature formation is believed to be field-induced segregation of $Se^-$ ions at the surface, followed by reduction of the Se ions to $H_2Se$ in a $H_2$ or $H_2O$ containing atmosphere. Since $H_2Se$ is a gas, a permanent trench is formed. For some applications (e.g., erasable memories) it is preferred that the nano-patterned features be erasable. The approach of Utsugi is inappropriate for such applications.

Information storage is a significant application of micro-patterned or nano-patterned surfaces. The use of a microscope probe tip to provide data storage by inducing localized electrochemical reactions is considered in U.S. Pat. No. 5,434,842. More specifically, patterning of materials having a reversibly modifiable charge state (or which dissociate into components) upon withdrawal or injection of electrons is considered. However, the materials considered in this work (e.g., a mixed monolayer of ferrocene-terminated and unsubstituted alkanethiols coadsorbed on a gold surface, or other self-assembled monolayers) can be difficult to work with and/or environmentally sensitive.

Accordingly, it would be an advance in the art to provide direct, erasable, environmentally insensitive nano-patterning of a surface.

SUMMARY

The present invention provides nano-patterning based on flow of an ion current within an ionic conductor to bring ions in proximity to a microscope probe tip touching a surface of the conductor. These ions are then electrochemically reduced to form one or more features on the surface. Ion current flow and the electrochemical reaction are driven by an electrical potential difference between the tip and the ionic conductor. Such features can be erased by reversing the polarity of the potential difference. Indentations can be formed by mechanically removing features formed as described above. The ions in the ion current can be provided by the ionic conductor and/or by oxidation at a counter electrode.

Since the present invention is a direct patterning approach, it is simpler than lithography based approaches. Other advantages of the invention compared to lithography include smaller feature size, reduced environmental sensitivity, precision process control, and flexible feature shaping. The present invention is also simpler than other direct microscope probe nano-patterning techniques. For example, in the present invention there is no fluid meniscus between the tip and surface being patterned. As a result, the present invention provides reduced environmental sensitivity compared to such approaches. The present invention also provides high data storage density (estimated density up to 1.5 $Tbit/in^2$) and reduced writing time compared to thermo-mechanical or mechanical local probe techniques.

DETAILED DESCRIPTION

Figure 1A:
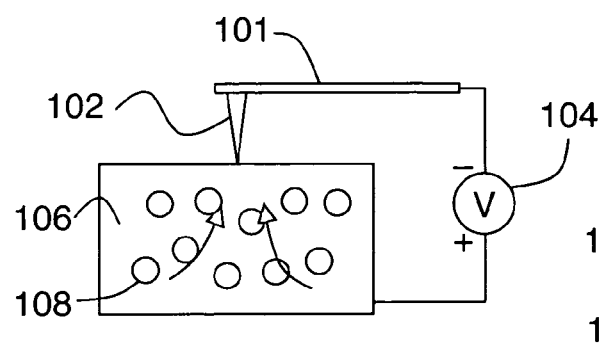
FIGS. 1a–e show nano-patterning according to a first embodiment of the invention.
Figure 1B:
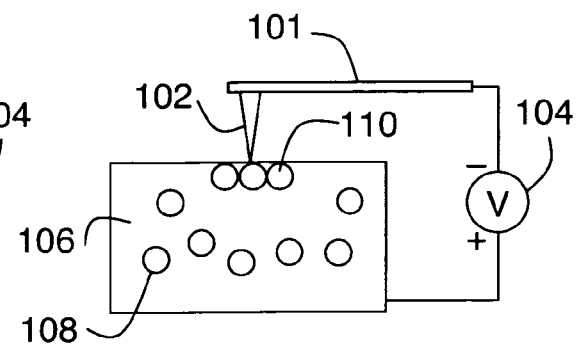
Figure 1C:
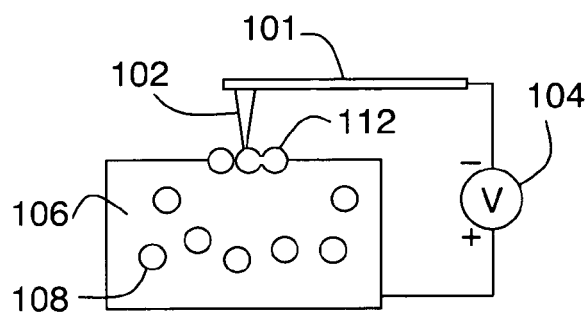
Figure 1D:
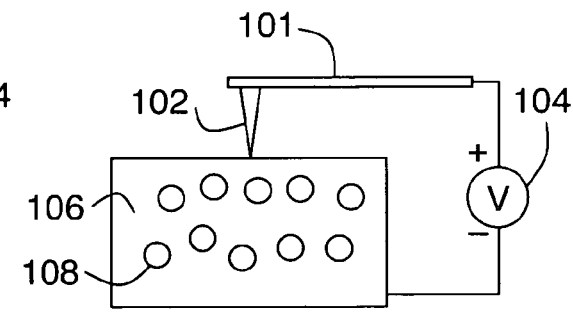

FIGS. 1a–e show nano-patterning according to a first embodiment of the invention. FIG. 1a shows an ionic conductor 106 having mobile positive ions 108 within it. An electrically conductive microscope probe tip 102 connected to an arm 101 makes contact with a surface of ionic conductor 106. An electrical source 104 provides a potential difference between probe tip 102 and a part of ionic conductor 106. The polarity of source 104 on FIG. 1a is such that ions 108 tend to move toward probe tip 102 via an ion current, as shown. Thus for positive ions 108, probe tip 102 is at a lower potential than ionic conductor 106. FIG. 1b shows the resulting accumulation of surface ions 110 near the probe tip. FIG. 1c shows reduction of surface ions 110 to form a topographic feature 112. Such electrochemical reduction occurs at the interface between probe tip 102 and the surface of ionic conductor 106, and involves the surface ions 110 delivered to the surface by the ion current. Thus feature 112 is a reduced product of this electrochemical reaction. Patterning according to this embodiment of the invention entails formation of one of more features such as feature 112.

Feature 112 has three key properties. First, feature 112 is topographic (i.e., relates to an alteration of surface profile). Therefore, information encoded onto a surface by formation of feature 112 can be accessed with any technique for surface profiling or imaging at the appropriate length scale. Typical heights for feature 112 are between about 0.5 nm and about 70 nm. Second, feature 112 is removable by altering the potential difference between probe tip 102 and ionic conductor 106. As shown on FIG. 1d, reversal of the polarity of source 104 causes oxidation of feature 112 to form mobile ions 108, which are driven into the bulk of ionic conductor 106 by the electric field. As shown, this reversal of the formation process leads to removal of feature 112 from the surface of ionic conductor 106. Formation and erasing of feature 112 can be performed multiple times at the same location, thereby providing a multiple write/overwrite capability for data storage/memory applications. Third, feature 112 can be, and preferably is, a nano-scale feature. More specifically, preferred lateral dimensions for feature 112 are between about 10 nm and about 500 nm. Patterning at this deep sub-micron length scale is especially advantageous for high density data storage applications.

Figure 1E:
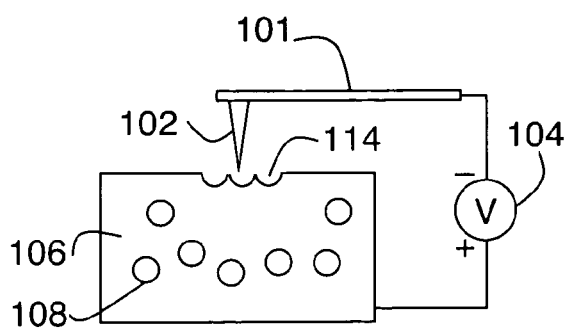

In an alternate embodiment of the invention, a feature 114 can be formed by mechanically removing feature 112 after it is formed, as shown on FIG. 1e. Feature 114 is typically an indentation, as opposed to the typical protrusion of feature 112. Such removal can be performed by scanning in normal contact mode using a higher contact force. The mechanical bond between feature 112 and ionic conductor 106 is found to increase in strength as the feature size increases. In one experiment, features 112 having a diameter of less than 100 nm were relatively easy to remove, and larger features were more difficult to remove.

Although the invention can be practiced with any microscope probe tip (e.g., an atomic force microscopy (AFM) tip, a scanning tunneling microscope (STM) tip, etc.), relatively soft probe tips (i.e., having a force constant between about 0.02 N/m and about 0.2 N/m) are preferred. Such soft probe tips reduce the chance of mechanical damage to the ionic conductor surface or to features formed on this surface. Electrical source 104 is preferably operated in a pulsed mode, in order to provide more precise control of patterning performance by adjusting pulse parameters. Typical voltage pulse durations are between about 0.2 ms and about 200 ms. Typical voltage pulse amplitudes are between about 50 mV and about 2 V. Feature volume is found to be proportional to pulse duration and exponentially dependent on pulse amplitude. Thus relatively short, high-amplitude pulses are preferred in applications requiring rapid feature formation (e.g., data storage). Preferably, a current sensing module within an AFM system is used to control the pulse parameters.

The invention can be practiced with the use of any ionic conductor as conductor 106. For example, ionic conductors for ions of Ag, Cu, Tl, Pb, Zn, Cd, Mn, Sr, Ca, Li, Na, and K are suitable for use with the invention. Preferred ionic conductors are fast ion conductors having high ion conductivity, in order to reduce the time required to form (and optionally erase) features. In one experiment, ionic conductor 106 was $RbAg_4I_5$, which selectively conducts Ag ions and has the highest known room temperature ionic conductivity of 0.27 S/cm. Examples of other suitable Ag ion conductors include AgI, $Ag_2Se$, $Ag_3SI$, $AgI-Ag_2WO_4$, $\beta$-$AgO.11Al_2O_3$, and $(AgI)_2Ag_3SbS_3$. Copper ion conductors (e.g., CuCl, CuI, CuS, $Cu_2Se$, $Rb_4Cu_{16}I_7Cl_{13}$, CuTeCl and others) are also suitable for practicing the invention.

The embodiment of FIGS. 1a–e relates to feature formation by ion migration within an ionic conductor. Such feature formation entails local alteration to the stoichiometry of the ionic conductor. For example, if the ionic conductor is $RbAg_4I_5$, formation of Ag nano-features leads to localized depletion of Ag ions from nearby regions of the ionic conductor. An alternative embodiment of the invention includes an electrode to provide a source for feature-forming ions.

Figure 2A:
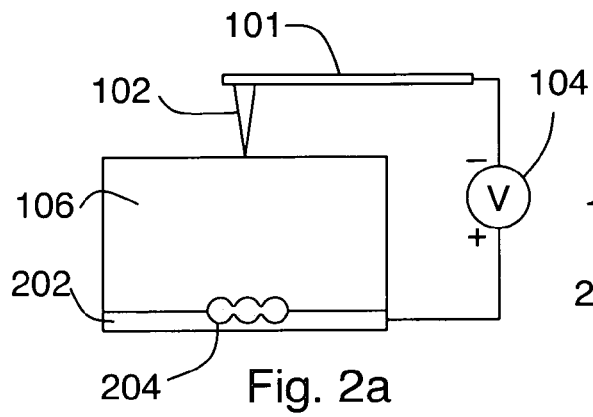
FIGS. 2a–e show nano-patterning according to a second embodiment of the invention.
Figure 2B:
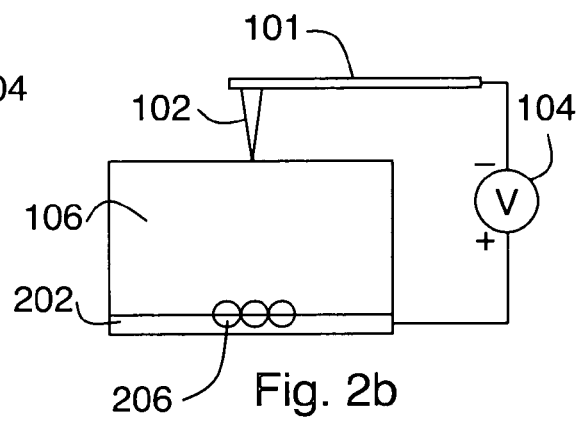
Figure 2C:
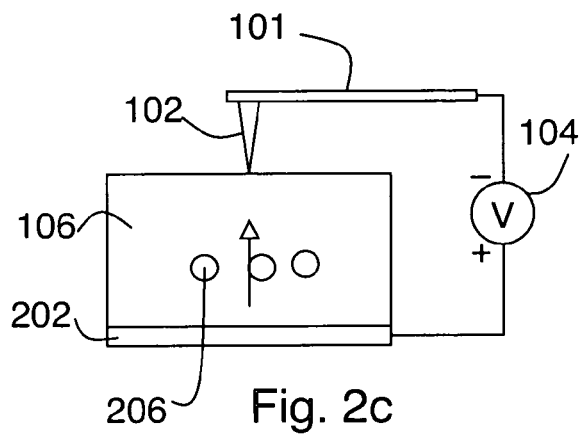
Figure 2D:
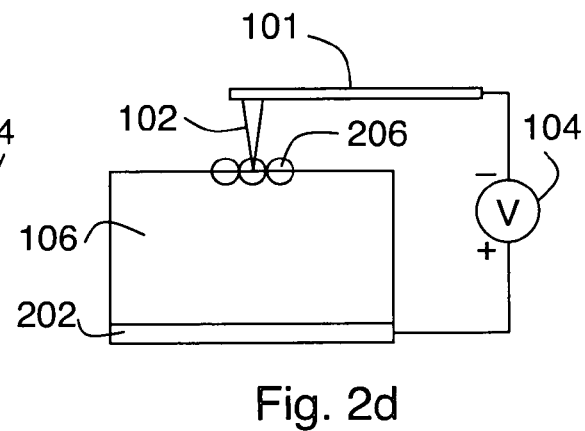
Figure 2E:
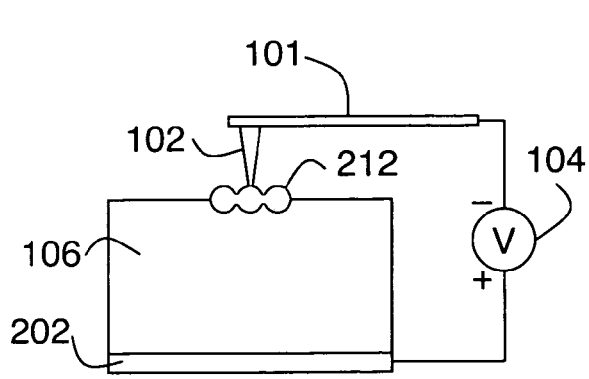

This alternative embodiment is shown in FIGS. 2a–e. FIG. 2a shows an arrangement similar to that of FIG. 1a, except that a counter electrode 202 is disposed on a surface of ionic conductor 106 other than the surface being patterned by probe tip 102. Electrical source 104 establishes a potential difference between tip 102 and electrode 202. Electrode 202 includes a material 204 which can oxidize at the interface between electrode 202 and ionic conductor 106 to provide ions 206, as shown on FIG. 2b. Ions 206 are mobile within ionic conductor 106, as shown on FIG. 2c. On FIG. 2d, arrival of ions 206 at the top surface of ionic conductor 106 near probe tip 102 is shown. FIG. 2e shows reduction of ions 206 to form feature 212. Feature 212 can be erased by altering (i.e., reversing the polarity) the potential difference supplied by source 104. As on FIG. 1e, feature 212 can be mechanically removed to form an indentation.

In this embodiment, the counter electrode includes a material capable of providing ions which are mobile in conductor 106 and which participate in the electrochemical reactions at the surfaces of ionic conductor 106. For example, if ionic conductor 106 is $RbAg_4I_5$, a suitable material for electrode 202 is Ag, which can provide Ag ions. Thus the electrode includes the same material that is deposited as feature 212 on ionic conductor 106 (i.e., a reduced product of the electrochemical reaction). In some embodiments of the invention, the mechanisms of FIGS. 1a–e and of FIGS. 2a–e may both be applicable simultaneously. For example, patterning of $RbAg_4I_5$ connected to an Ag counter electrode can entail any combination of local Ag ion depletion and Ag oxidation at the counter electrode.

Figure 3:
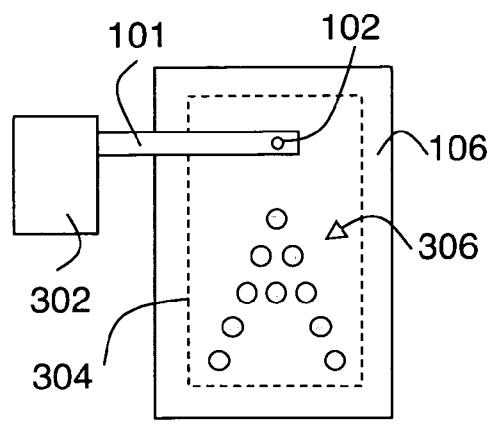
FIG. 3 shows a system for nano-patterning according to an embodiment of the invention.

The preceding description relates to processes for forming a feature at a location. The ability to form one or more features having locations selectable within a predetermined area is useful for various nano-patterning applications. Such extension of the preceding methods is straightforward, since conventional AFM and STM systems typically include suitable actuators. FIG. 3 shows a top view of a system for nano-patterning according to an embodiment of the invention. An actuator 302 moves arm 101 such that probe tip 102 can be applied to any location within a predetermined area 304. Patterning according to the invention (e.g., as described in connection with FIGS. 1a–e and/or FIGS. 2a–e) can provide any desired pattern on the surface of ionic conductor 106, e.g., pattern 306 as shown.

Figure 4:
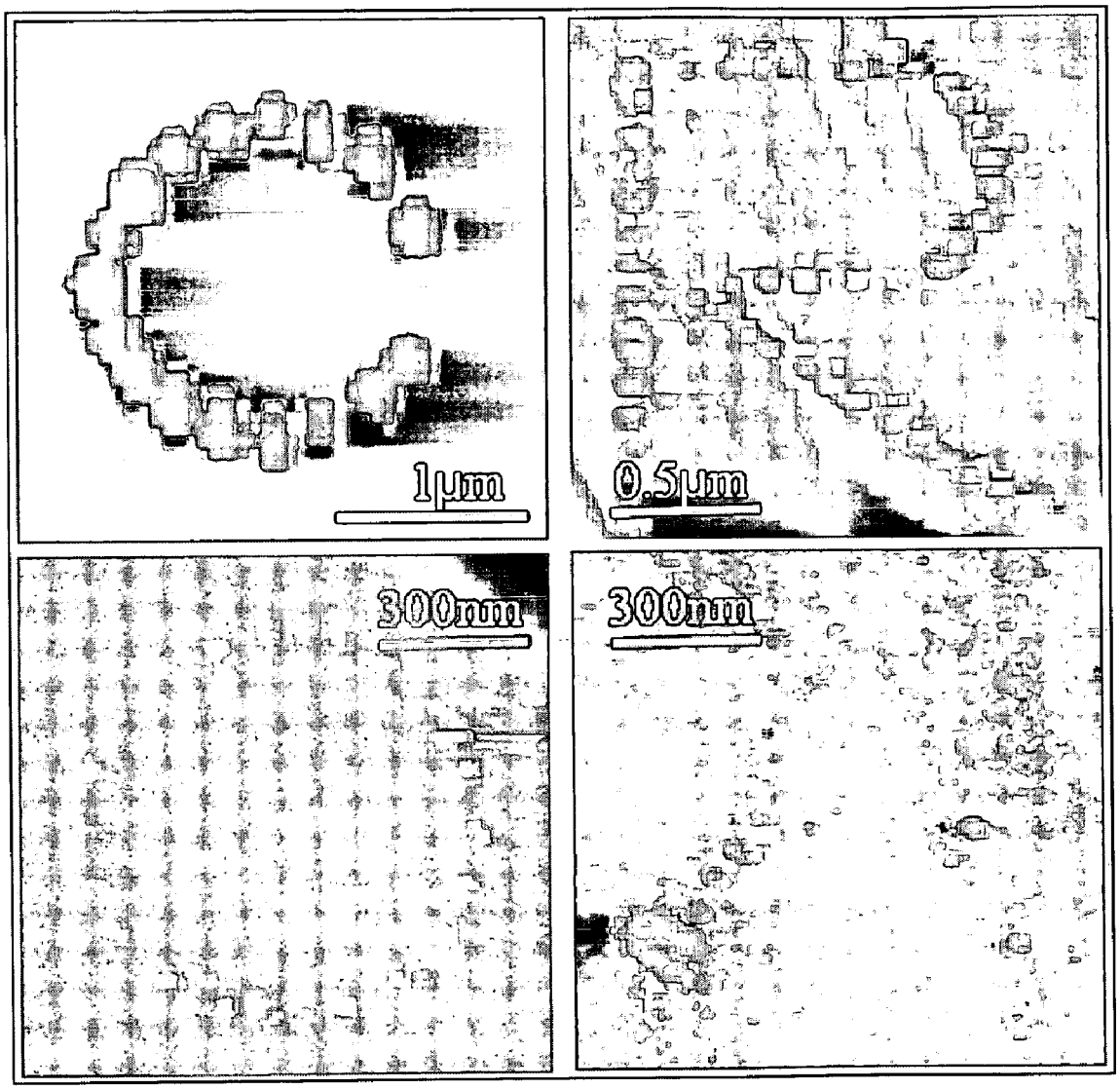
FIG. 4 shows photographs of patterns produced according to the invention.

FIG. 4 shows photographs of patterns produced according to the invention. In these examples, ionic conductor 106 is $RbAg_4I_5$. In the top left of FIG. 4, 50 nm high features were generated by 200 mV, 5 ms pulses, one pulse for each dot. In the top right of FIG. 4, 2 nm high features were generated by 400 mV, 1 ms pulses, one pulse for each dot. In the lower left and lower right of FIG. 4, 0.6 nm indentations were generated by 200 mV, 1 ms pulses, one pulse for each dot. The indentations of the lower half of FIG. 4 were formed by mechanical removal of electrochemically formed features (e.g., as on FIG. 1e).

Figure 5:
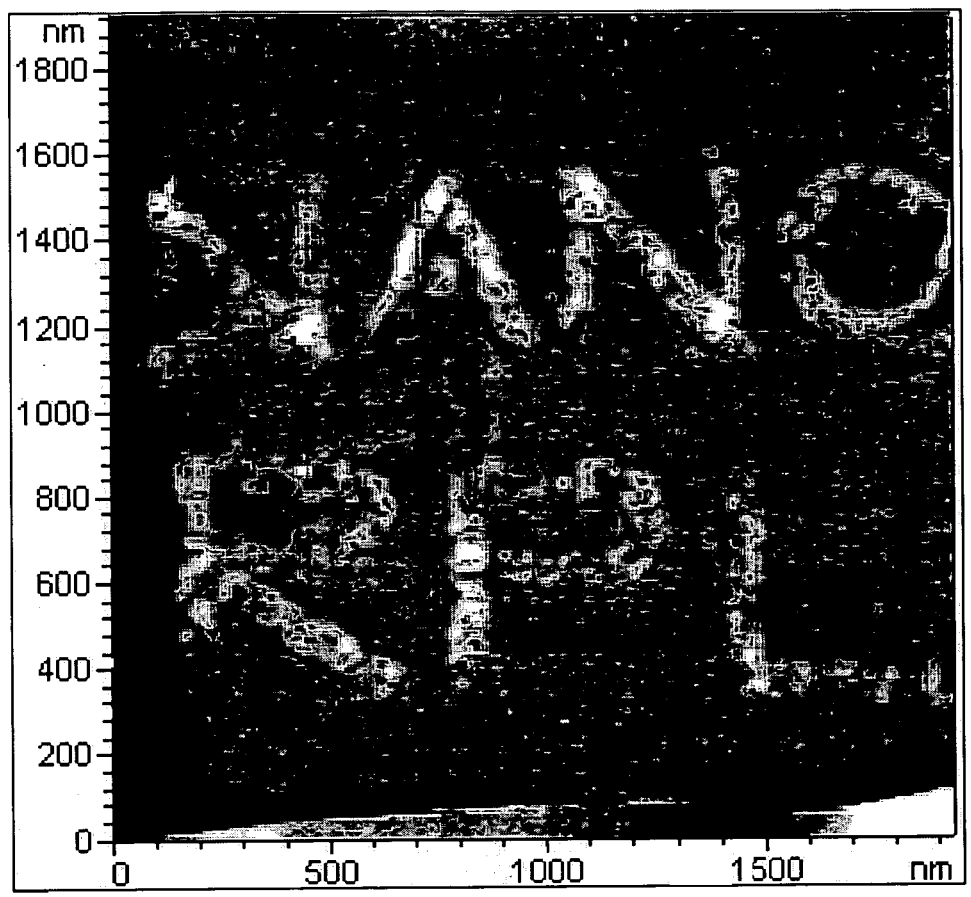
FIG. 5 shows another photograph of a pattern produced according to the invention.

FIG. 5 shows another photograph of a pattern produced according to the invention. In this example, ionic conductor 106 is $RbAg_4I_5$, and 200 mV pulses were used. The upper letters "NANO" have a dot spacing of 17 nm and a pulse duration of 0.25 ms. The lower letters "RPL" have a dot spacing of 22 nm and a pulse duration of 0.3 ms.

Figure 6A:
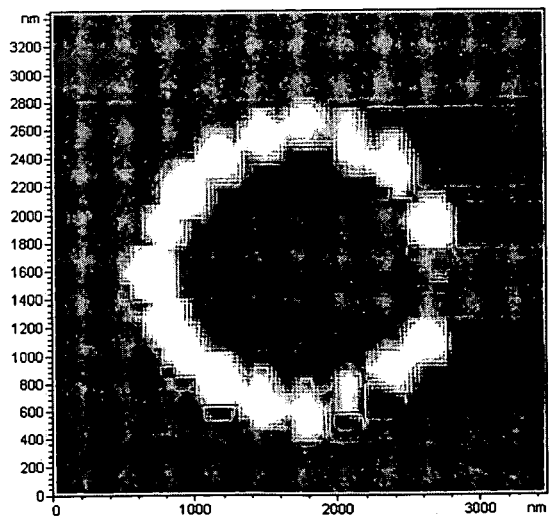
FIGS. 6a–b show further photographs of patterns produced according to the invention.
Figure 6B:
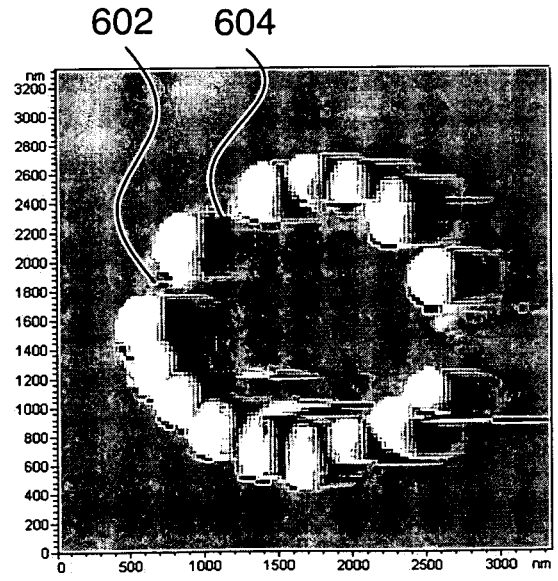

FIGS. 6a–b show further photographs of patterns produced according to the invention. In this example, ionic conductor 106 is $RbAg_4I_5$. FIG. 6a shows a positive pattern (50 nm high features generated by 200 mV, 5 ms pulses, one pulse for each dot). FIG. 6b shows the pattern of FIG. 6a where indentations 602 and 604 have been formed by mechanically removing two of the dots of the pattern of FIG. 6a. For removing patterns, a normal contact mode scan was performed with a higher contact force than was used for generating patterns.

The invention claimed is:

1. A method for patterning a surface of an ionic conductor, the method comprising:
   providing an electrically conductive probe tip in contact with a selected location on the surface, wherein an interface is between the probe tip and the selected location;
   providing an electrical potential difference between the probe tip and a part of the ionic conductor, wherein the potential difference induces an ion current within the ionic conductor, and wherein the potential difference induces an electrochemical reaction involving the ion current at the interface;
   forming a topographic feature at the selected location, wherein the topographic feature comprises a reduced product of the electrochemical reaction, and wherein the topographic feature is removable by altering the electrical potential difference.

2. The method of claim 1, further comprising erasing said topographic feature by altering said electrical potential difference.

3. The method of claim 1, further comprising mechanically removing said topographic feature from said surface, whereby a corresponding indentation is formed in said surface.

4. A method for patterning a surface of an ionic conductor, the method comprising:
   selecting two or more locations on said surface;
   forming a topographic feature at each of the locations according to the method of claim 1.

5. A patterning system comprising:
   an ionic conductor having a first surface;
   an electrically conductive probe tip capable of making contact with the first surface at a selected location to define an interface between the first surface and the probe tip;
   an electrical source providing an electrical potential difference between the probe tip and a part of the ionic conductor;
   wherein the potential difference induces an ion current within the ionic conductor;
   wherein the potential difference induces an electrochemical reaction involving the ion current at the interface;
   wherein a topographic feature at the selected location is formed;
   wherein the topographic feature comprises a reduced product of the electrochemical reaction;
   wherein the topographic feature is removable by altering the electrical potential difference.

6. The system of claim 5, wherein said probe tip has a force constant between about 0.02 N/m and about 0.2 N/m.

7. The system of claim 5, wherein said electrical potential difference is pulsed.

8. The system of claim 7, wherein a pulse duration of said electrical potential difference is between about 0.2 ms and about 200 ms.

9. The system of claim 7, wherein a pulse amplitude of said electrical potential difference is between about 50 mV and about 2 V.

10. The system of claim 5, wherein said topographic feature has lateral dimensions between about 10 nm and about 500 nm.

11. The system of claim 5, wherein said ion current comprises ions of one or more elements selected from the group consisting of: Ag, Cu, Tl, Pb, Zn, Cd, Mn, Sr, Ca, Li, Na, and K.

12. The system of claim 5, wherein said ionic conductor comprises a material selected from the group consisting of: $RbAg_4I_5$, AgI, $Ag_2Se$, $Ag_3SI$, $AgI\text{-}Ag_2WO_4$, $\beta\text{-}AgO.11Al_2O_3$, $(AgI)_2Ag_3SbS_3$, CuCl, CuI, CuS, $Cu_2Se$, $Rb_4Cu_{16}I_7Cl_{13}$, and CuTeCl.

13. The system of claim 5, further comprising a counter electrode disposed on a second surface of said ionic conductor.

14. The system of claim 13, wherein said counter electrode comprises said reduced product of said electrochemical reaction.

15. The system of claim 5, further comprising an actuator for moving the probe tip to select any location on said first surface within a predetermined area.

* * * * *